(12) United States Patent
Azema

(10) Patent No.: US 6,296,965 B1
(45) Date of Patent: Oct. 2, 2001

(54) CELL ELECTRICAL PATH BREAKING MECHANISM

(75) Inventor: Tadamitsu Azema, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/392,345

(22) Filed: Sep. 8, 1999

(30) Foreign Application Priority Data

Sep. 10, 1998 (JP) .................................................. 10-257319

(51) Int. Cl.[7] .................................................. H01M 2/34
(52) U.S. Cl. .................................. 429/61; 429/7; 429/57; 429/90
(58) Field of Search .................................. 429/61, 7, 90, 429/57

(56) References Cited

U.S. PATENT DOCUMENTS

| | | |
|---|---|---|
| 4,943,497 | 7/1990 | Oishi et al. . |
| 5,705,290 | 1/1998 | Azema . |
| 6,228,523 | * 5/2001 | Azema .................................. 429/61 |

* cited by examiner

Primary Examiner—John S. Maples
(74) Attorney, Agent, or Firm—Brinks Hofer Gilson & Lione

(57) ABSTRACT

A cell electrical path breaking mechanism in which an electrical path is formed between a cell case and an external cathode through a diaphragm and a connection member. When the internal pressure in the cell case increases to a value equal to or greater than a predetermined value, causing the diaphragm to be displaced upward, the connection member is severed, so that the electrical path is broken. Even when flammable gas or the like is generated in the cell due to an abnormality in the cell, the cell electrical path breaking mechanism makes the cell safe to use by preventing an arc produced when the connection member is severed as a result of the displacement of the diaphragm from igniting the flammable gas.

9 Claims, 5 Drawing Sheets

CELL ELECTRICAL PATH BREAKING MECHANISM

BACKGROUND OF THE INVENTION

1. Field of the Invention

The present invention relates to a cell electrical path breaking mechanism, and, more particularly, to a cell electrical path breaking mechanism which makes a storage cell, renewable by recharging, safe to use.

2. Description of the Related Art

For example, chargeable lithium ion secondary cells are widely used as electrical power sources in portable devices such as portable telephones or personal computers. In such secondary cells, organic solvent type electrolyte is injected into a cell case, which is hermetically sealed.

However, when such secondary cells are overcharged when they are recharged, or when an amount of electrical current larger than a specified amount is passed through them, an abnormality occurs in the cell, causing gas to be produced in the cell case. The production of gas increases the pressure and the temperature in the cell case. When the pressure and the temperature increase, the cell case expands and cracks, causing the electrolyte in the cell case to leak out of it, which adversely affects devices incorporating such secondary cells.

Even if the abnormality occurring in such secondary cells is not as serious as that described above, it is still necessary to stop using any abnormal cells immediately. This is because continued use of abnormal cells causes them to expand more and more, which may cause cell cases incorporating abnormal cells to rupture.

To prevent a cell from rupturing, a cell electrical path breaking mechanism is used. A conventional cell electrical path breaking mechanism used with a circular cell is shown in FIGS. 9 and 10. A cell cover 3 and an actuator 4 are mounted to a cell case 1. The cell cover 3 is mounted by welding or caulking through a gasket 2 in order to hermetically seal the cell case 1. The actuator 4 which can be displaced upward is provided below the cell cover 3.

Vent holes 3a are formed in the cell cover 3 in order to allow the portion of the air between the cell cover 3 and the actuator 4 to escape therefrom to the outside when the actuator 4 below the cell cover 3 is displaced upward and rupturing occurs.

The actuator 4 includes an annular safety valve portion 4a, which is formed by drawing or the like and which includes a protrusion 4b and grooves 4c. The protrusion 4b protrudes downward at the center portion of the actuator 4. The grooves 4c are formed radially in the surface around the protrusion 4b.

Below the actuator 4 is disposed an insulating plate 5, which has a hole 5a and a vent hole 5b formed therethrough. The hole 5a is formed to receive the protrusion 4b of the safety valve portion 4a.

Below a portion of the insulating plate 5 is disposed a lead fixing member 6, which has a hole 6a and a vent hole 6b formed therein. The hole 6a connects to the hole 5a formed in the insulating plate 5. The vent hole 6b connects to the vent hole 5b formed in the insulating plate 5.

The protrusion 4b of the safety valve portion 4a is binserted into the hole 5a of the insulating plate 5 and the hole 6a of the lead fixing member 6. A lead 7 formed of a thin metallic plate is mounted to the summit of the protrusion 4b.

The lead 7 includes a connection portion 7a which is joined to the summit of the protrusion 4b by welding or the like. It allows electrical conduction between the actuator 4 and the lead 7. The edge of the lead 7 not joined to the protrusion 4b is connected to a generating element 8 disposed below the lead 7, whereby an electrical path is formed between the generating element 8 and the cell cover 3.

The cell case 1 is filled with an electrolyte (not shown).

When an abnormality occurs in the cell, so that the pressure in the cell case 1 is increased, gas whose pressure has been increased flows from the vent holes 5b and 6b, as indicated by arrow A in FIG. 10. When this takes place, a force which tries to push the back surface of the safety valve portion 4a upward is exerted thereto.

When the force exerted on the safety valve portion 4a causes stress to be concentrated at the connection portion 7a of the lead 7, and this concentrated stress becomes larger that the shear stress of the connection portion 7a, the connection portion 7a breaks off or peels off from the lead 7. This electrically disconnects the lead 7 and the actuator 4 from each other, thereby breaking the electrical path of the cell.

When the electrical path is broken, the flow of electrical current in the cell is interrupted. This suppresses pressure increase in the cell case 1, making it possible to prevent the cell from rupturing.

The production of smaller portable telephones or any other types of portable device using such conventional cells has caused a stronger demand for smaller and thinner cells (so that they can be used in smaller portable devices).

However, in conventional cell electrical path breaking mechanisms such as that described above, when an abnormality occurs in the cell, flammable gas is sometimes produced in the electrolyte or the like. When the internal pressure in the cell increases to a value equal to or greater than a predetermined value, causing the connection portion 7a to break off from the lead 7, an arc may be generated. The arc may ignite the flammable gas, and cause an explosion.

It is necessary to construct such conventional cell electrical path breaking mechanisms so that an arc is not produced when connection portion 7a breaks off from the lead 7. However, constructing cell electrical path breaking mechanisms taking this into account limits the types of material that can be used to form the actuator 4 or the like, and the forms that the actuator 4 or the like can take, thereby limiting the freedom with which cell electrical path breaking mechanisms can be designed.

SUMMARY OF THE INVENTION

Accordingly, in order to overcome the above-described problems, it is an object of the present invention to provide a cell electrical path breaking mechanism which makes cells safe to use and which has a simple structure, wherein if the electrical path in the cell is broken, and an arc is produced, the arc does not ignite the gas in the cell.

To this end, according to an aspect of the present invention, there is provided a battery electrical path breaking mechanism comprising:

a cell case connected to a generating element accommodated in the cell case;

a cell cover for hermetically sealing the cell case;

a diaphragm formed at a portion of the cell cover so as to bulge towards the inner side of the battery case, the diaphragm being displaceable in accordance with changes in internal pressure in the battery case;

a connection member disposed above the diaphragm for connection to the diaphragm;

an external electrode electrically connected to the connection member; and a holding member for holding the external electrode, with the connection member being joined to the diaphragm;

wherein an electrical path is formed between the cell case and the external electrode through the diaphragm and the connection member; and wherein when the internal pressure in the cell case increases to a value equal to or greater than a predetermined value, causing the diaphragm to be displaced upward, the connection member is severed, causing the electrical path to be broken.

In the battery electrical path breaking mechanism of the aforementioned aspect of the present invention, the connection member may include hold portions formed on both sides thereof, and a connection portion formed between the hold portions for connecting the diaphragm thereto, with both hold portions being held by the holding member. Here, when the diaphragm is displaced upward, the connection portion and the hold portions are severed from each other, causing the electrical path to be broken.

In the battery electrical path breaking mechanism of the aforementioned aspect of the present invention, the connection member may include a hold portion formed on one side thereof, and a connection portion formed on the other side thereof for connecting the diaphragm thereto, with the hold portion formed on one side of the connection member being held by the holding member. Here, when the diaphragm is displaced upward, the connection portion and the hold portion are severed from each other, causing the electrical path to be broken.

When the connection member includes hold portions at both sides thereof, and a connection portion formed between the hold portions for connecting the diaphragm thereto, or when the connection member includes a hold portion formed at one side thereof, and a connection portion formed at the other side thereof for connecting the diaphragm thereto, the connection member may have an easily severable stress concentration portion formed between the hold portion and the connection portion such that when the diaphragm is displaced upward, the connection portion and the hold portion are severed from the stress concentration portion.

When the connection member has an easily severable stress concentration portion, the stress concentration portion may have a groove and a cutout formed therein, with the groove being formed to make a wall between the hold portion and the connection portion thin, and with the cutout being formed where an edge of the groove and an edge surface of the connection member intersect.

When the connection member has an easily severable stress concentration portion, there may be provided internal stress which tries to warp upward at all times a side of the connection portion adjacent to the stress concentration portion, so that when the connection portion is severed from the stress concentration portion, the connection portion is warped upward.

DESCRIPTION OF THE PREFERRED EMBODIMENTS

Figure 1:
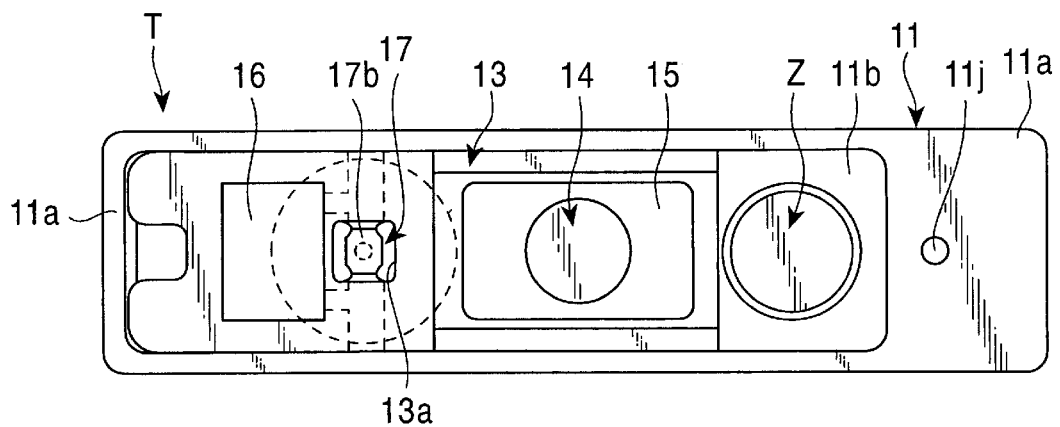
FIG. 1 is a top view of an embodiment of the cell electrical path breaking mechanism in accordance with the present invention.
Figure 2:
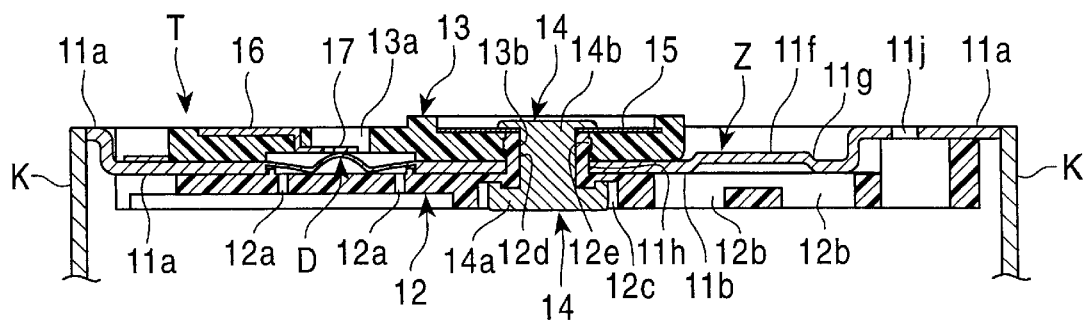
FIG. 2 is a sectional view of the main portion of the cell electrical path breaking mechanism in accordance with the present invention.
Figure 3:
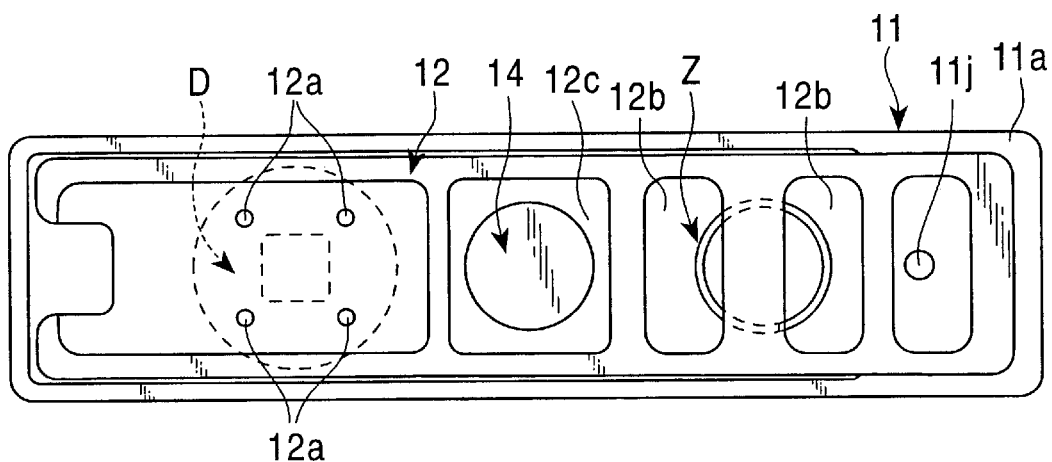
FIG. 3 is a bottom view of the embodiment of the cell electrical path breaking mechanism in accordance with the present invention.
Figure 4:
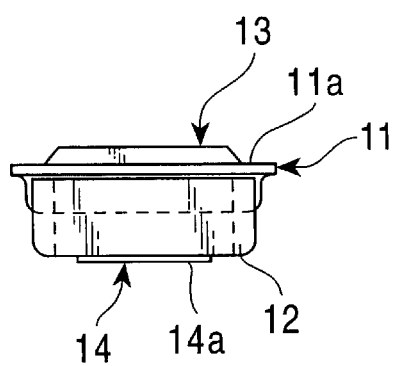
FIG. 4 is a side view of the embodiment of the cell electrical path breaking mechanism in accordance with the present invention.
Figure 5:
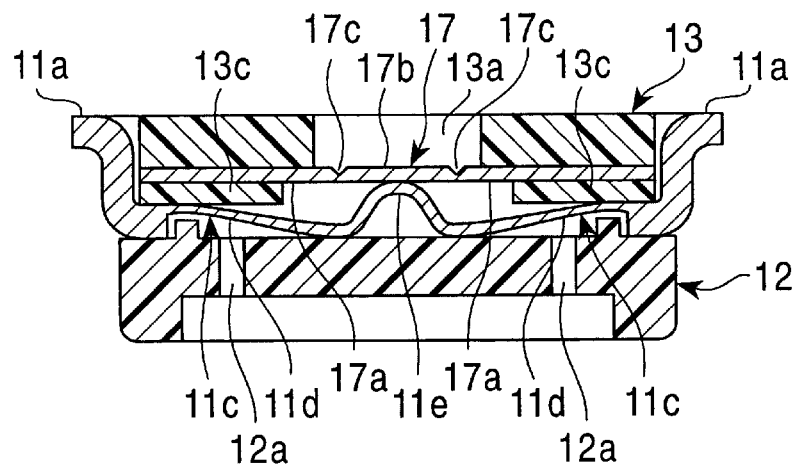
FIG. 5 is an enlarged sectional view of the main portion of the cell electrical path breaking mechanism in accordance with the present invention.
Figure 6:
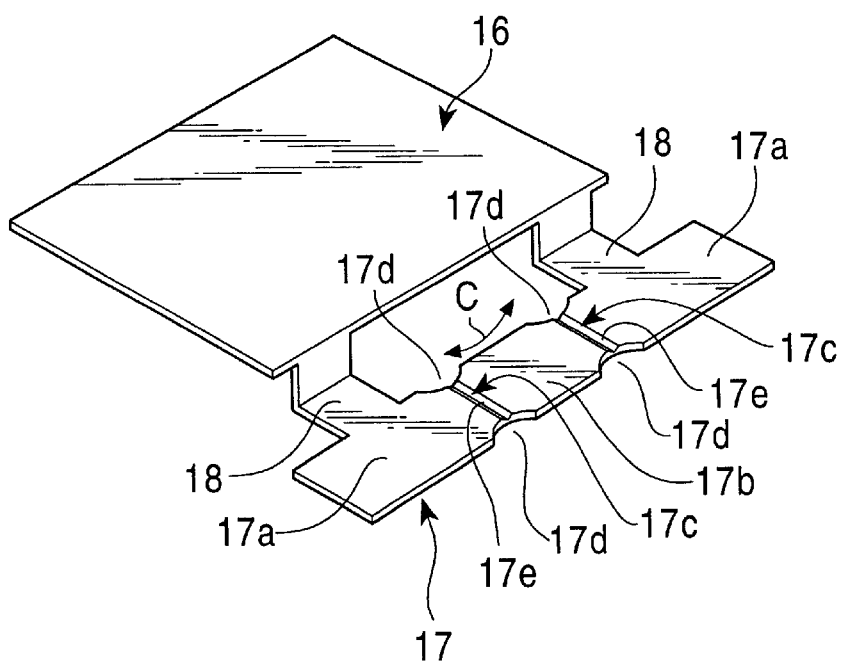
FIG. 6 is a perspective view of a connection member and an external cathode, used in the embodiment of the present invention.
Figure 7:
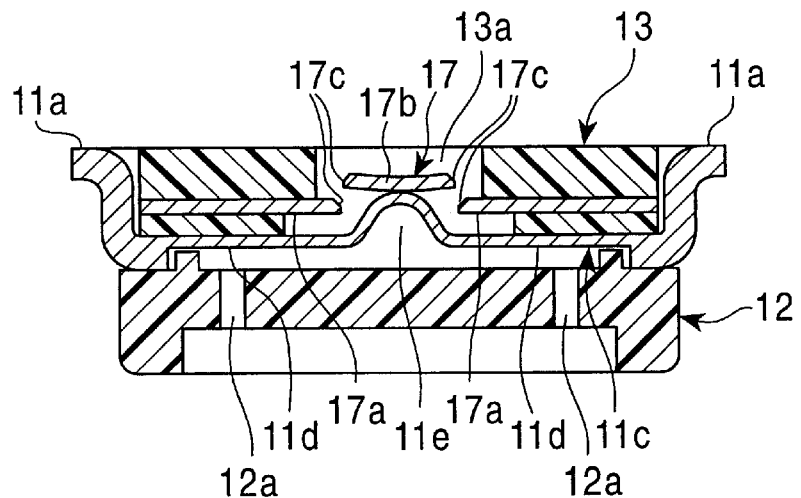
FIG. 7 is a schematic view illustrating the operation of the cell electrical path breaking mechanism in accordance with the present invention.
Figure 8:
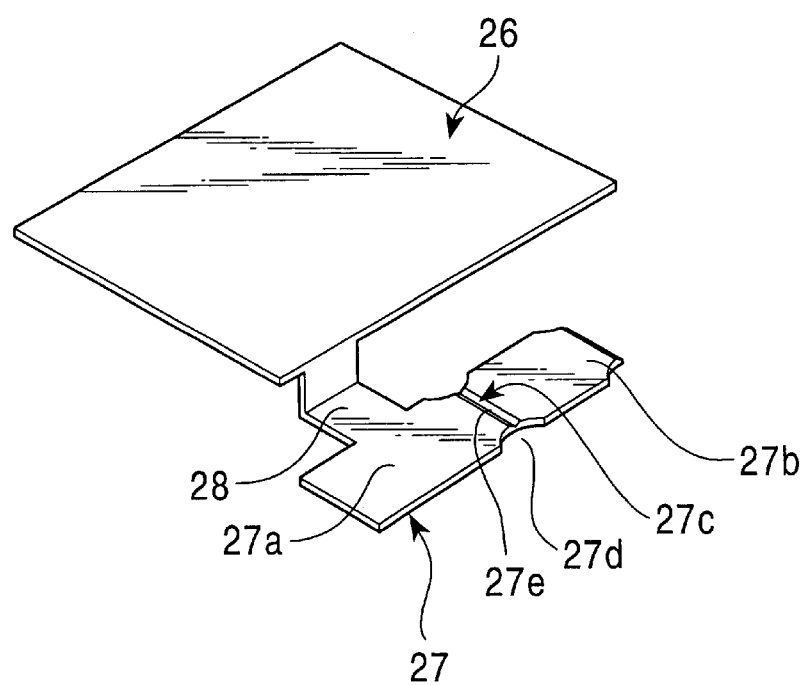
FIG. 8 is a perspective view of another example of the connection member, used in the embodiment of the present invention.
Figure 9:
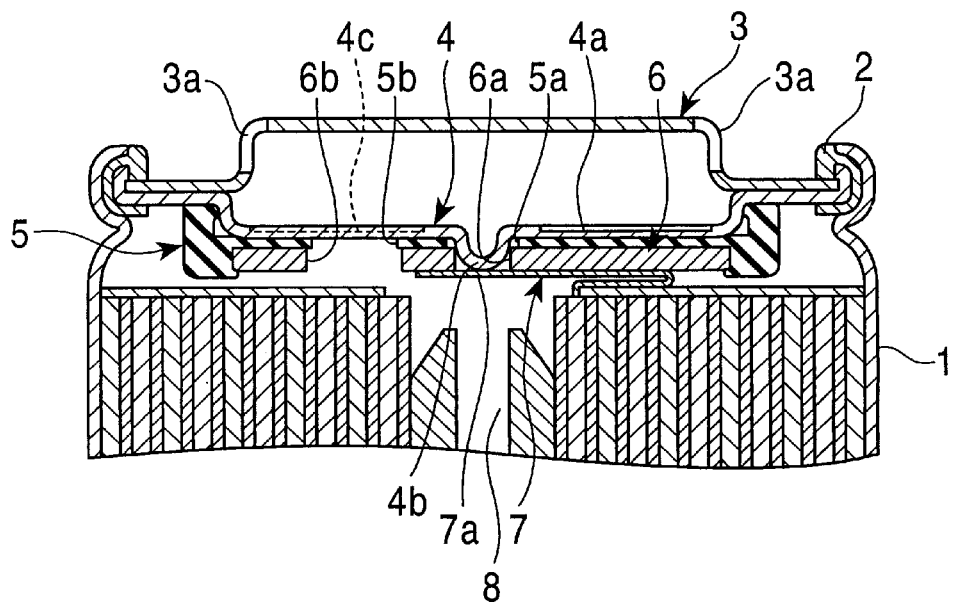
FIG. 9 is a sectional view of the main portion of a conventional cell electrical path breaking mechanism.
Figure 10:
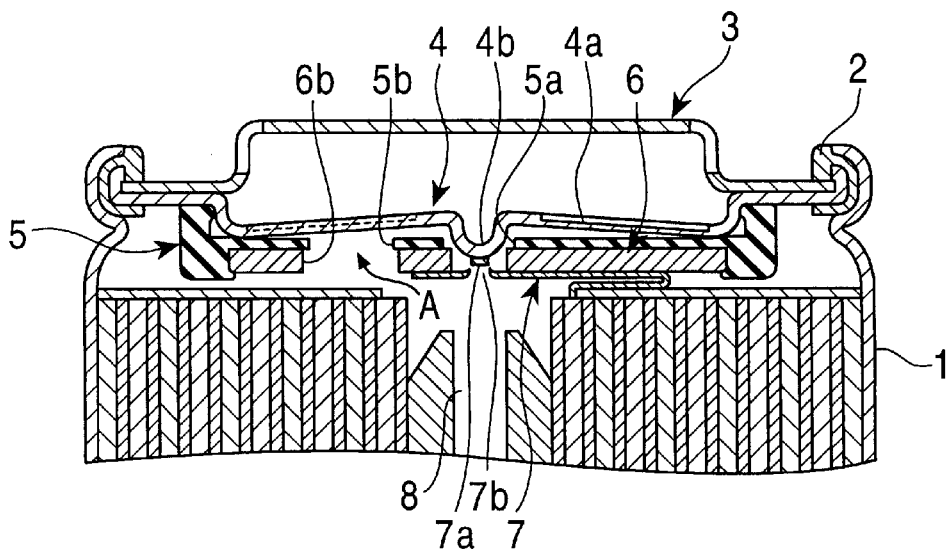
FIG. 10 is a sectional view of the operation of the main portion of the conventional cell electrical path breaking mechanism.

A description will now be given of embodiments of the cell electrical path breaking mechanism in accordance with the present invention. FIG. 1 is a top view of the cell electrical path breaking mechanism in accordance with the present invention. FIG. 2 is a sectional view of the main portion of the cell electrical path breaking mechanism, with a cell cover being mounted to a cell case. FIG. 3 is a bottom view of the cell electrical path breaking mechanism in accordance with the present invention. FIG. 4 is a side view of the cell electrical path breaking mechanism in accordance with the present invention. FIG. 5 is an enlarged sectional view of the main portion of the cell electrical path breaking mechanism in accordance with the present invention. FIG. 6 is a perspective view of the external cathode and the connection member, used in the embodiment of the present invention. FIG. 7 is a schematic view of the operation of the cell electrical path breaking mechanism of the embodiment of the present invention. FIG. 8 is a perspective view of another example of a connection member, used in the embodiment of the present invention.

A description will now be given of the general structure of a cell electrical path breaking mechanism T of the present invention used with a square cell, with reference to FIGS. 1 to 4. A cell case K which accommodates a generating element (not shown) is disposed. A cell cover 11 is mounted to the cell case K to hermetically seal the cell case K. A diaphragm D which bulges towards the inside of the cell case K is formed in the cell cover 11.

The cell cover 11 is sandwiched between an insulating member 12, mounted to the lower portion of the cell cover 11, and a holding member 13, mounted to the upper portion of the cell cover 11. The cell cover 11, the insulating member 12, and the holding member 13 are formed into an integral structure by rivetting an end of a rivet 14 provided at the center portion of the cell cover 11.

An external cathode 16 is held by the holding member 13, and is electrically connected to a connection member 17 joined to the diaphragm D. An anode of the generating element is connected to the lower portion of the rivet 14. An external anode 15, held by the holding member 13, is connected to the upper portion of the rivet 14.

In the general structure of the electrical path breaking mechanism of the present invention, the cathode of the generating element (not shown) is connected to the cell case K, and an electrical path is formed between the cell case K and the external cathode 16 through the diaphragm D and the connection member 17.

The cell cover 11 has a substantially rectangular outside shape. It is formed of an electrically conductive metallic plate, such as a stainless steel plate. The cell cover 11 has flat flange portions 11a and a bottom plate 11b. The flat flange portions 11a are formed at the outer periphery of the cell cover 11. The bottom plate 11b is formed by subjecting the portion located inwardly of the flange portions a to drawing or the like so that the bottom plate 11b protrudes downward and extends horizontally.

The diaphragm D (formed on the left side in FIG. 2) and a safety valve portion Z (formed on the right side in FIG. 2) are integrally formed with portions of the bottom plate 11b of the cell cover 11.

As shown in FIG. 5 (which is an enlarged sectional view of the main portion of the electrical path breaking mechanism T), annular recesses 11c are formed in the lower surface of the bottom plate 11b by grinding or the like. The portion defining each recess 11c located towards the outer side of the diaphragm D is formed with a small wall thickness. The portion defining the recesses 11c located around the center portion of the diaphragm D is formed with a large wall thickness. The portions having a small wall thickness form thin-walled portions 11d.

Each thin-walled portion 11d is formed like the shape of a bowl by pressing or the like so as to bulge downward in FIG. 5. The center portion of the portion having a large wall thickness is formed so as to protrude upward in FIG. 5, whereby a protrusion 11e is formed.

The protrusion 11e can be displaced upward, with the base of each thin-walled portion 11d (formed at the outer peripheral side of its associated recess 11c ) as fulcrum.

The safety valve portion Z is formed by a protrusion 11f and a connection portion 11g. The protrusion 11f has a substantially annular outside shape, is flat and thick-walled, and protrudes upward. The connection portion 11g is formed by making the wall of the base located at the outer peripheral side of the protrusion 11f thin. A center hole 11h is formed in the center portion of the cell cover 11 of FIG. 2 to receive a boss portion 12e (described later) of the insulating member 12.

An electrolyte injection hole 11j is formed through the slightly wide right flange 11a.

The insulating member 12 is formed at the lower surface of the bottom plate 11b of the cell cover 11. It has a smaller external size than the cell cover 11, is rectangular in shape, and is formed of a resinous material. A plurality of first vent holes 12a are formed in the portion of the insulating member 12 located below the recesses 11c formed in the diaphragm D. When the pressure in the cell increases, high-pressure gas passes through the first vent holes 12a, so that pressure which tries to push the diaphragm D upward is transmitted thereto.

Two second vent holes 12b are formed in the portion of the insulating member 12 located below the safety valve portion Z. A hole 12c is formed by spot facing to a predetermined depth in the center portion of the insulating member 12. A head 14a of the rivet 14 is placed in the hole 12c. A boss portion 12e is formed in the center portion of the hole 12c so as to protrude upward. It has a rivet hole 12d for receiving the rivet 14.

The holding member 13 is disposed on the top surface of the bottom plate 11b of the cell cover 11. The cell cover 11 is sandwiched between the insulating member 12 and the holding member 13.

The holding member 13 is formed of an insulating resinous material. A substantially rectangular hole 13a is formed on the left side of the holding member 13. The diaphragm D is inserted into the hole 13a when it is displaced upward. A through hole 13b is formed on the right side of the holding member 13 to receive the boss portion 12e of the insulating member 12. The holding member 13 is disposed by inserting the boss portion 12e into the center hole 11h formed in the cell cover 11 so that it protrudes above the center hole 11h, and then by inserting the portion of the boss portion 12e which protrudes above the center hole 11h into the through hole 13b. The holding member 13 has flat stopper portions 13c formed at the lower side thereof. When the diaphragm D is displaced upward, the thin-walled portions 11d bump into their respective stopper portions 13c, thereby limiting the amount by which the diaphragm D is displaced upward. The top portion of the safety valve portion Z is open.

The rivet 14, formed of aluminum or the like, is inserted into the rivet hole 12d formed in the insulating member 12. The head 14a of the rivet 14 is disposed in the hole 12c. A rivet portion 14b protruding upward from the head 14a is inserted in the rivet hole 12d.

The rivet portion 14b of the rivet 14 is formed using a rivetting tool (not shown) so that the rivet portion 14b is substantially circular in shape and bulges outward, and is electrically connected to the external anode 15 formed of a nickel plate or the like and disposed around the through hole 13b. Through a connecting terminal (not shown), it is also connected to the anode of a generating element (not shown) disposed in the cell case K, whereby the external anode 15 and the generating element are electrically connected.

A sealing material (not shown), such as synthetic rubber, is applied to the portion of the head 14a of the rivet 14 which contacts the bottom portion defining the hole 12c, whereby the cell case K is hermetically sealed.

The external anode 15 has a rivet hole 15a which can receive the rivet portion 14b before it is rivetted. It is integrally formed with the holding member 13 by insert molding or the like, at a location of the surface of the holding member 13 carved out to a predetermined depth.

The external cathode 16 is disposed at the left portion of the surface defining the hole 13a formed in the holding member 13. As shown in FIG. 6, the connection member 17, a portion of which is disposed in the hole 13a formed in the holding member 13, is coupled through joining portions 18 to the external cathode 16, whereby the external cathode 16 and the connection member 17 are formed into an integral structure and electrically connected together.

The external cathode 16 and the connection member 17 are formed of a nickel plate or the like. As shown in FIG. 6, by pressing or the like, the external cathode 16 is formed into a substantially rectangular shape, and the connection member 17 is formed into a vertically long, rectangular shape. The external cathode 16 and the connection member 17 are formed into an integral structure by coupling them through the two joining portions 18 and 18.

The connection member 17 is stepped down below the external cathode 16 by a predetermined amount.

The connection member 17 includes hold portions 17a and 17a formed at both sides thereof in the longitudinal direction thereof. A connection portion 17b is formed between the hold portions 17a and 17a for connecting the summit of the thick-walled protrusion 11e of the diaphragm D thereto by spot welding or the like.

The connection member 17 has easily severable stress concentration portions 17a and 17a, formed between their respective hold portions 17a and the connection portion 17b. As shown in FIG. 6, for example, the stress concentration portions 17c and 17c have groove portions 17e and 17e (which are for example V-shaped), and cutouts 17d (which are for example U-shaped). When each V-shaped groove portion 17e is formed, a thin-walled boundary is formed between its associated hold portion 17a and the connection portion 17b. Each U-shaped cutout 17d is formed by cutting out a portion of the connection member 17 where each groove portion 17e and an edge surface of the connection member 17 intersect.

As shown in FIG. 5, the hold portions 17a are supported and held by the holding member 13 by carrying out insert molding or the like.

As shown in FIG. 2, in the cell electrical path breaking mechanism T of the present invention having the above-described structure, the flanges 11a formed at the outer periphery of the cell cover 11 are mounted to the openings of the cell case K which accommodate a generating element (not shown) therein, whereby the cell cover 11 is mounted to the cell case K. Then, a predetermined type of electrolyte (not shown) is injected into the electrolyte injection hole 11j. When the electrolyte injection hole 11j is sealed by welding or the like, the cell case K is hermetically sealed.

Accordingly, in a cell with the cell electrical path breaking mechanism T mounted thereto, an electrical path is formed between the cell case K (connected to the cathode of a generating element which is not shown) and the external cathode 16 through the diaphragm D and the connection member 17.

A description will now be given of the operation of the cell electrical path breaking mechanism T of the present invention. When an abnormality occurs in the cell, so that gas or the like is generated in the cell, causing the internal pressure in the cell case K to increase, the gas in the cell flows into the recesses 11c from the first vent holes 12a.

When this takes place, the high-pressure gas which has flown into the recesses 11c causes a force which tries to push the thin-walled portions 11d upward to be exerted on the diaphragm D.

When the internal pressure in the cell increases to a value which is equal to or greater than a predetermined value, the diaphragm D is moved upward, causing the stress concentration portions 17c and 17c to be severed. Then, the diaphragm D is displaced upward without stopping, and turned.

When the diaphragm D is displaced upward, the connection portion 17b is severed from the hold portions 17a of the connection member 17, causing the electrical path between the cell case K and the external cathode 16 to be broken.

Breakage of the electrical path limits the amount by which the pressure in the cell case K increases, making it possible to obviate the problem of rupturing, cracking, or the like, of the cell case K.

If the internal pressure in the cell keeps on increasing even though the electrical path has been broken, a force which tries to push up the protrusion portion 11f of the safety valve portion Z is exerted thereupon due to the further increase in internal pressure. The force causes the thin-walled connection portion 11g to be ruptured. The high-pressure gas in the cell is discharged to the outside from the ruptured portion, making it possible to obviate the problem of cell rupturing or the like.

The connection member 17 is formed by pressing or the like so that internal stress tries to warp upward at all times the sides of the connection portion 17b adjacent their respective stress concentration portions 17c, in the directions indicated by the double-headed arrow C in FIG. 6.

In other words, internal stress exists in the connection member 17, which tries to warp upward at all times the sides of the connection portion 17b adjacent their respective stress concentration portions 17c. Therefore, when the connection portion 17b is severed from the stress concentration portions 17c, it warps in the upward direction, as shown in FIG. 7.

In the above-described embodiment of the present invention the hold portions 17a of the connection member 17 was described as being supported and held by the holding member 13. In another embodiment, one hold portion may be supported and held by the holding member in order to form a structure allowing an electrical path to be broken. As shown in FIG. 8, a connection member 27 has a hold portion 27a provided at one side thereof, and a connection portion 27b provided at the other side thereof for connection to the protrusion 11e of the diaphragm D. An easily severable stress concentration portion 27c is formed at the boundary between the connection portion 27b and the hold portion 27a by forming a cutout 27d and a groove 27e.

An external cathode 26 and a joining portion 28 are electrically connected to form the connection member 27, the external cathode 26 and the joining portion 28 into an integral structure. The hold portion 27a of the linking portion 27 is supported by the holding member 13. When the diaphragm D is displaced upward, the hold portion 27a and the connection portion 27b are severed from the stress concentration portion 27c, causing the electrical path between the cell case K and the external cathode 26 to be broken.

In the above-described embodiment of the present invention, the easily severable stress concentration portion 17c was formed at the linking portion 17a. In another embodiment, the entire linking portion 17c may be formed into a thin-walled structure, so that when the diaphragm D is displaced upward, the connection member 17 is severed from a predetermined portion thereof, causing the electrical path between the cell case K and the external cathode 26 to be broken.

In an aspect of the present invention, there is provided a cell electrical path breaking mechanism comprising a connection member disposed above a diaphragm for connection to the diaphragm. An electrical path is formed between a battery case and an external cathode through the diaphragm and the connection member. When the internal pressure in the battery case increases to a value equal to or greater than a predetermined value, causing the diaphragm to be displaced upward, the connection member is severed, causing the electrical path to be broken. By virtue of this structure, since the connection member is disposed at the outer side of the diaphragm, even if flammable gas is produced in the battery due to an abnormality in the battery, and the connection member is severed, causing an arc to be generated, the arc does not ignite the flammable gas produced in the battery. Therefore, the battery electrical path breaking mechanism is very safe to use, and has a simple structure.

In the battery electrical path breaking mechanism of the aforementioned aspect of the present invention, the connection member may include hold portions formed at both sides thereof, and a connection portion formed between the hold portions for connecting the diaphragm thereto, with both hold portions being held by the holding member. Here, when the diaphragm is displaced upward, the connection portion and the hold portions are severed from each other, causing the electrical path to be broken. By virtue of this structure, the hold portions and the connection portion can be reliably severed from each other.

In the battery electrical path breaking mechanism of the aforementioned aspect of the present invention, the connection member may include a hold portion formed at one side thereof, and a connection portion formed at the other side thereof for connecting the diaphragm thereto, with the hold portion formed at one side of the connection member being held by the holding member. In this case, when the diaphragm is displaced upward, the connection portion and the hold portion are severed from each other, causing the electrical path to be broken. By virtue of this structure, small connection portions formed of a material with good yield can be formed.

When the connection member includes hold portions formed at both sides thereof, and a connection portion formed between the hold portions for connecting the diaphragm thereto, or when the connection member includes a hold portion formed at one side thereof, and a connection portion formed at the other side thereof, the connection member may have an easily severable stress concentration portion formed between the hold portion and the connection portion such that when the diaphragm is displaced upward, the connection portion and the hold portion are severed from the stress concentration portion. By virtue of this structure, the connection portion and the hold portion can be easily and reliably severed from each other.

When the connection member has an easily severable stress concentration portion, the stress concentration portion may have a groove and a cutout formed therein, with the groove being formed to make a wall between the hold portion and the connection portion thin, and with the cutout being formed where an edge of the groove and an edge surface of the connection member intersect. By virtue of this structure, the hold portion and the connection portion can be easily severed even under a lower pressure.

When the connection member has an easily severable stress concentration portion, there may be provided internal stress which tries to warp upward at all times a side of the connection portion adjacent to the stress concentration portion, so that when the connection portion is severed from the stress concentration portion, the connection portion is warped upward. By virtue of this structure, even when the diaphragm is displaced downward when the pressure in the battery falls, the connection portion does not come into contact with the hold portion because after being severed from the stress concentration portion they are greatly separated from each other. Therefore, the battery electrical path breaking mechanism is very safe to use.

What is claimed is:

1. A cell electrical path breaking mechanism comprising:
    a cell case connected to a generating element accommodated in the cell case;
    a cell cover for hermetically sealing the cell case;
    a diaphragm formed at a portion of the cell cover, the diaphragm being displaceable in accordance with changes in internal pressure in the battery case;
    a connection member disposed above the diaphragm for connection to the diaphragm;
    an external electrode electrically connected to the connection member; and
    a holding member for holding the external electrode, with the connection member being joined to the diaphragm;
    wherein an electrical path is formed between the cell case and the external electrode through the diaphragm and the connection member; and
    wherein when the internal pressure in the cell case increases to a value equal to or greater than a predetermined value, causing the diaphragm to be displaced upward or turned, the connection member is severed, causing the electrical path to be broken.

2. A cell electrical path breaking mechanism according to claim 1, wherein the connection member includes hold portions formed on both sides thereof, and a connection portion formed between the hold portions for connecting the diaphragm thereto, with both hold portions being held by the holding member; and wherein when the diaphragm is displaced upward, the connection portion and the hold portions are severed from each other, causing the electrical path to be broken.

3. A cell electrical path breaking mechanism according to claim 1, wherein the connection member includes a hold portion formed on one side thereof, and a connection portion formed on the other side thereof for connecting the diaphragm thereto, with the hold portion formed on one side of the connection member being held by the holding member; and wherein when the diaphragm is displaced upward, the connection portion and the hold portion are severed from each other, causing the electrical path to be broken.

4. A cell electrical path breaking mechanism according to claim 2, wherein the connection member has an easily severable stress concentration portion formed between the hold portion and the connection portion such that when the diaphragm is displaced upward, the connection portion and hold portion are severed from the stress concentration portion.

5. A cell electrical path breaking mechanism according to claim 4, wherein the stress concentration portion has a groove and a cutout formed therein, with the groove being formed to make a wall between the hold portion and the connection portion thin, and with the cutout being formed where an edge of the groove and an edge surface of the connection member intersect.

6. A cell electrical path breaking mechanism according to claim 4, wherein internal stress is provided which tries to warp upward at all times a side of the connection portion adjacent to the stress concentration portion, so that when the connection portion is severed from the stress concentration portion, the connection portion is warped upward.

7. A cell electrical path breaking mechanism according to claim 3, wherein the connection member has an easily severable stress concentration portion formed between the hold portion and the connection portion such that when the diaphragm is displaced upward, the connection portion and hold portion are severed from the stress concentration portion.

8. A cell electrical path breaking mechanism according to claim 7, wherein the stress concentration portion has a groove and a cutout formed therein, with the groove being formed to make a wall between the hold portion and the connection portion thin, and with the cutout being formed where an edge of the groove and an edge surface of the connection member intersect.

9. A cell electrical path breaking mechanism according to claim 8, wherein internal stress is provided which tries to warp upward at all times a side of the connection portion adjacent to the stress concentration portion, so that when the connection portion is severed from the stress concentration portion, the connection portion is warped upward.

* * * * *